(12) United States Patent
Park et al.

(10) Patent No.: US 11,319,039 B2
(45) Date of Patent: *May 3, 2022

(54) VESSEL DATA INTEGRATION SYSTEM

(71) Applicants: Hyundai Heavy Industries Co., Ltd., Ulsan (KR); Korea Shipbuilding & Offshore Engineering Co., Ltd., Seoul (KR)

(72) Inventors: Ki Soo Park, Ulsan (KR); Jong Gu Kang, Ulsan (KR); Young Soo Cheong, Ulsan (KR); Jee Hoon Park, Ulsan (KR); Seong Min Ha, Ulsan (KR); Dan Bi Lee, Ulsan (KR); Chan Ho Song, Ulsan (KR)

(73) Assignees: Hyundai Heavy Industries Co., Ltd., Ulsan (KR); Korea Shipbuilding & Offshore Engineering Co., Ltd., Seoul (KR)

( * ) Notice: Subject to any disclaimer, the term of this patent is extended or adjusted under 35 U.S.C. 154(b) by 569 days.

This patent is subject to a terminal disclaimer.

(21) Appl. No.: 16/308,362

(22) PCT Filed: Jul. 27, 2016

(86) PCT No.: PCT/KR2016/008243
§ 371 (c)(1),
(2) Date: Dec. 7, 2018

(87) PCT Pub. No.: WO2017/213292
PCT Pub. Date: Dec. 14, 2017

(65) Prior Publication Data
US 2019/0147669 A1    May 16, 2019

(30) Foreign Application Priority Data
Jun. 9, 2016    (KR) .......................... 10-2016-0071685

(51) Int. Cl.
*G07C 5/00*    (2006.01)
*G06F 16/25*    (2019.01)
(Continued)

(52) U.S. Cl.
CPC .............. *B63B 79/10* (2020.01); *B63B 49/00* (2013.01); *B63B 69/00* (2013.01); *B63B 71/00* (2020.01);
(Continued)

(58) Field of Classification Search
None
See application file for complete search history.

(56) References Cited

U.S. PATENT DOCUMENTS 7,805,146 B1 * 9/2010 Beyer, Jr. ................. G08G 3/00
455/456.1
8,838,985 B1 * 9/2014 Robbins .................... H04L 9/32
713/182
(Continued)

FOREIGN PATENT DOCUMENTS

| KR | 10-1103279 B1 | 1/2012 |
| KR | 10-1527681 B1 | 6/2015 |
| KR | 10-1623896 B1 | 5/2016 |

OTHER PUBLICATIONS

J-W. Park et al., "The Current Situation of the Digital Interface International Standards and an Analysis of Integration Condition of Ships." Journal of the Society of Naval Architects of Korea, vol. 48, No. 6, pp. 490-500, 2011.
(Continued)

*Primary Examiner* — Todd Melton
*Assistant Examiner* — Jason R Roberson
(74) *Attorney, Agent, or Firm* — Blank Rome LLP

(57) ABSTRACT

The present invention relates to a vessel data integration system and a vessel comprising same. Accordingly, the
(Continued)

present invention preferably comprises: a first vessel data conversion device for converting first vessel data which have a non-standard format and are received from first equipment; a second vessel data conversion device for converting second vessel data which have a standard format and are received from second equipment; a data processing device for classifying, by type, the integrated vessel data received from the vessel data conversion device; a complex event processing (CEP) device for filtering out integrated vessel data, which needs to be transmitted in real-time; and a real-time data transmission device for transmitting in real-time the integrated vessel data.

12 Claims, 11 Drawing Sheets

(51) Int. Cl.
| | |
|---|---|
| *B63B 69/00* | (2013.01) |
| *B63B 79/10* | (2020.01) |
| *G06F 16/909* | (2019.01) |
| *G06F 16/903* | (2019.01) |
| *G06F 16/9038* | (2019.01) |
| *G06F 16/9035* | (2019.01) |
| *B63J 99/00* | (2009.01) |
| *G06Q 50/00* | (2012.01) |
| *B63B 71/00* | (2020.01) |
| *G06F 16/28* | (2019.01) |
| *B63B 49/00* | (2006.01) |
| *G06F 16/84* | (2019.01) |
| *G06F 9/54* | (2006.01) |
| *G08G 3/00* | (2006.01) |
| *B63B 79/00* | (2020.01) |
| *G06K 9/62* | (2022.01) |

(52) U.S. Cl.
CPC .............. *B63J 99/00* (2013.01); *G06F 9/546* (2013.01); *G06F 16/258* (2019.01); *G06F 16/285* (2019.01); *G06F 16/288* (2019.01); *G06F 16/84* (2019.01); *G06F 16/909* (2019.01); *G06F 16/9035* (2019.01); *G06F 16/9038* (2019.01); *G06F 16/90335* (2019.01); *G06Q 50/00* (2013.01); *G07C 5/008* (2013.01); *G08G 3/00* (2013.01); *B63B 79/00* (2020.01); *G06F 9/541* (2013.01); *G06K 9/6288* (2013.01)

(56) References Cited

U.S. PATENT DOCUMENTS

2014/0266793 A1\* 9/2014 Velado .................... B63B 79/40
340/870.16
2016/0013998 A1 1/2016 Coloney et al.

OTHER PUBLICATIONS

J-H. Lee et al., "Conversion and Storage of NMEA 2000 PGN Data Into IEC 61162-4 Tag Format." Journal of the Korean Society of Marine Engineering, vol. 34, No. 4, pp. 522-531, 2010.

L. Cazzanti et al., "A Document-based Data Model for Large Scale Computational Maritime Situational Awareness", 2015 IEEE International Conference on Big Data, Oct. 29, 2015, pp. 1350-1356.

Amelie Gyrard, "An Architecture to Aggregate Heterogeneous and Semantic Sensed Data", Advances in Biometrics : International Conference, ICB 2007, pp. 697-701.

\* cited by examiner

FIG. 7

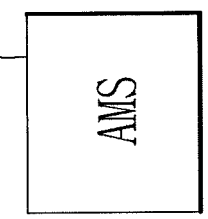

Periodically transmit alarm list
- List changing over time
- Same information transmitted while overlapping
- Data/Alarm classification field needed { Key1, Description, Type, Level, AlarmTime, AckTime, NormalTime, Limit, Value }
{ Key2, Description, Type, Level, AlarmTime, AckTime, NormalTime, Limit, Value }
{ Key3, Description, Type, Level, AlarmTime, AckTime, NormalTime, Limit, Value }
...
{ Key*n*, Description, Type, Level, AlarmTime, AckTime, NormalTime, Limit, Value }

When it is at a maximum, 5000~6000point
Transmission point can be limited on the basis of time Key → VDMPath Mapping Process alarm message by CEP rule
and transmit it by format/transmission method
desired by onshore platform using collected Data/Config Periodic transmission → Vessel data conversion device (110) → Vessel data integration system (100) → Event transmission → Onshore service platform

AMS (13)

| AlarmMessage Type | | |
|---|---|---|
| Attribute name | Attribute type | Description |
| vPath | String | |
| timestamp | String | UTC Time |
| desc | String | Readable Description |
| signalType | Enumerated | Digital/Analog/System |
| status | Enumerated | Alarm Status |
| alarmTime | Timestamp | Time when alarm occurred |
| ackTime | Timestamp | Time when acknowledged |
| normalTime | Timestamp | Time when cleared |
| type | Enumerated | Type of Alarm |
| value | String | Value |
| unit | Value type | Unit type |
| limit | | Threshold |

VESSEL DATA INTEGRATION SYSTEM

TECHNICAL FIELD

The present disclosure relates to a vessel data integration system and a vessel comprising the same.

BACKGROUND ART

Vessels are categorized according to the purpose of use, the type of cargo and the method by which the cargo is loaded, and vessels may be classified into commercial vessels, specialized vessels, military vessels and fishing vessels according to the purpose of use, and may be classified into container ships, bulk carriers, tankers, chemical tankers, LPG carriers, LNG carriers and car carriers according to the type of cargo.

Various types of vessels as described above each have a great deal of sensors and devices mounted thereon to function for use that suits the purpose.

Each sensor and device are collected and processed by integration equipment and provided to a service necessary for safe navigation, and because one or more sensors and devices are made using different protocols for each manufacturer, it was not easy to collect data, and even though data is collected, there is no method for managing the collected data in an integrated manner, so there are many constraints on transfer and utilization of the collected data not only on board but also on shore.

Meanwhile, International Maritime Organization (IMO) compels the specified "Maritime navigation and radiocommunication equipment and systems" (e.g., Voyage Data Recorder (VDR), Integrated Navigation System (INS), etc.) to conform to International Electronical Committee (IEC) 61162 based digital interfaces. Here, IEC 61162 is the communication standards for communication interfaces between "Maritime navigation and radiocommunication equipment and systems", and IEC 61162 is aligned with the National Marine Electronics Association (NMEA) standard.

In contrast, equipment (e.g., Alarm Monitoring System (AMS), Bridge Maneuvering System (BMS), etc.) other than "Maritime navigation and radiocommunication equipment and systems" is not bound to conform to IEC 61162. Additionally, there is a great limitation in expressing data using the already published NMEA, and thus other industrial standards or a de facto standard is mainly selected and used.

By this reason, there is no common standard for interfacing between equipment other than "Maritime navigation and radiocommunication equipment and systems".

For example, the NMEA sentence structure receiving the position from Global Positioning System (GPS) is as shown in FIG. 1. The NMEA sentence is shared between system developers through a standard document, but any individual modification is not allowed.

When data to be used on the IEC 61162 standards is not data that is predefined in NMEA sentence, is it is necessary to additionally perform a task for defining the corresponding data in NMEA sentence under the mutual agreement, and share through an interface agreement document between them.

As described above, when data to be used on the IEC 61162 standards is not predefined in NMEA sentence, there is inconvenience in having to additionally define the data, write it in a document and share it.

Technical Problem

The present disclosure is designed to solve the above-described problem, and therefore the present disclosure is directed to providing a vessel data integration system for converting various formats of vessel data into a vessel data model (VDM)-based integrated vessel data format and transmitting it to an external device, and a vessel comprising the same.

SUMMARY OF THE INVENTION

To achieve the above-described object, a vessel data integration system according to an embodiment of the present disclosure preferably includes a first vessel data conversion device for converting first vessel data which have a non-standard format and are received from first equipment into integrated vessel data by using a vessel data model (VDM)-based VDM path, a second vessel data conversion device for converting second vessel data which have a standard format and are received from second equipment into the integrated vessel data, a data processing device for classifying, by type, the integrated vessel data received from the first vessel data conversion device or the second vessel data conversion device, a complex event processing (CEP) device for filtering out integrated vessel data, among the integrated vessel data classified by the data processing device, which needs to be transmitted in real-time, and a real-time data transmission device for transmitting in real-time the integrated vessel data filtered out by the CEP device to an on-land management system.

The vessel data integration system according to an embodiment of the present disclosure preferably further includes a DB for storing the integrated vessel data classified by the data processing device, and a batch data transmission device for transmitting the integrated vessel data stored in the DB to the on-land management system in a preset cycle.

In the vessel data integration system according to an embodiment of the present disclosure, the DB is preferably provided for each type of the integrated vessel data.

In the vessel data integration system according to an embodiment of the present disclosure, a transmission format of the integrated vessel data preferably includes a header region including at least one of a transaction ID, a device ID, a device type, a tenant ID and an enterprise ID, and a data region including a VDM path and vessel data.

In the vessel data integration system according to an embodiment of the present disclosure, the vessel data preferably includes at least one dataset including collected Value, a time at which the Value is collected, and whether the Value is valid or invalid.

In the vessel data integration system according to an embodiment of the present disclosure, the data processing device preferably classifies the integrated vessel data based on tag information of the integrated vessel data.

In the vessel data integration system according to an embodiment of the present disclosure, preferably, the data processing device includes a rule engine to manage a data validity validation rule necessary to verify validity of the integrated vessel data, and verifies validity of the received integrated vessel data according to the data validity validation rule.

In the vessel data integration system according to an embodiment of the present disclosure, the data processing device preferably include a rule engine to allow the integrated vessel data classified by type to be stored in a specified DB.

In the vessel data integration system according to an embodiment of the present disclosure, a type of the integrated vessel data preferably includes alarm data, sensor data and configuration data.

In the vessel data integration system according to an embodiment of the present disclosure, the integrated vessel data which needs to be transmitted in real-time is preferably alarm data.

Meanwhile, a method for transmitting vessel data in a vessel data integration system according to an embodiment of the present disclosure preferably includes converting, by the system, first vessel data which have a non-standard format and are received from first equipment into integrated vessel data by using a VDM-based VDM path, converting, by the system, second vessel data which have a standard format and are received from second equipment into the integrated vessel data, classifying, by the system, the integrated vessel data collected through the first vessel data conversion device or the second vessel data conversion device by type, filtering, by the system, integrated vessel data which needs to be transmitted in real-time among the classified integrated vessel data, and transmitting, by the system, the filtered integrated vessel data to an on-land management system in real-time.

The method for transmitting vessel data in a vessel data integration system according to an embodiment of the present disclosure preferably further includes storing, by the system, the classified integrated vessel data, and transmitting, by the system, the integrated vessel data stored in the DB to the on-land management system in a preset cycle.

Advantageous Effects

According to the vessel data integration system of the present disclosure and the vessel comprising the same, it is possible to manage (collect, store, provide) vessel data in various formats made by different protocols into an integrated data format.

BRIEF DESCRIPTION OF THE DRAWINGS

FIG. 7 is a diagram illustrating the procedure of transmitting alarm data generated by AMS according to an embodiment of the present disclosure.

DETAILED DESCRIPTION OF THE PREFERRED EMBODIMENTS

Figure 1:
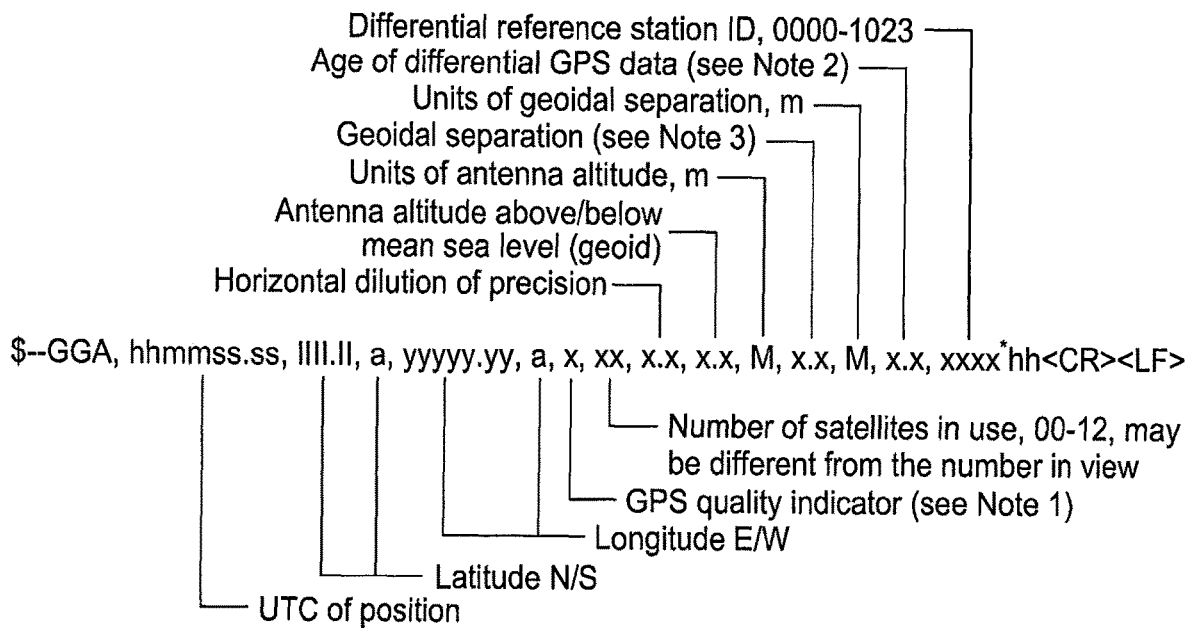
FIG. 1 is an exemplary diagram showing the conventional NMEA sentence structure.

Hereinafter, a vessel data integration system according to a preferred embodiment of the present disclosure and a vessel comprising the same will be described in detail with reference to the accompanying drawings.

In describing the embodiments of the specification, when a certain detailed description of relevant known elements or functions is determined to render the subject matter of the present specification vague, the detailed description may be omitted herein.

The terms "comprises" and "comprising" as used herein specify the presence of stated functions, operations and elements, but do not preclude the presence or addition of one or more other functions, operations and elements. Additionally, it should be understood that the term "comprises" or "includes" when used in this specification specifies the presence of stated features, figures, steps, operation, elements, components or groups thereof, but does not preclude the presence or addition of one or more other features, figures, steps, operations, elements, components or groups thereof. As used herein, the singular forms are intended to include the plural forms as well, unless the context clearly indicates otherwise.

The key terms as used herein are defined as follows.

Vessel data integration platform (VDIP) is for collecting, processing, analyzing, storing and transmitting various vessel data, and refers to any system including software, firmware and hardware devices that manage vessel data in an integrated manner or their selective combinations, or may be used in software sense.

In an embodiment of the present disclosure, VDIP and a vessel data integration system may be used in the equivalent sense.

Vessel data model (VDM) is a data model for defining all data associated with the vessel into one system, and objectifies all devices ranging from the vessel itself to an end sensor and defines a relationship between objects and attributes of objects.

Vessel data model configuration description Language (VCL) is the language used to write a vessel data model configuration description file for describing VDM.

Vessel data model configuration description file is a configuration file that describes VDM in VCL.

Mapping configuration description file is a file that defines a rule for converting equipment output data into VDM-based integrated vessel data.

Mapping is a process of connecting equipment output data to VDM.

Equipment is mounted in the vessel for special purposes, and collects various types of vessel data generated in the vessel and transmits the collected vessel data to VDIP. Equipment may be divided into first equipment with a vessel data conversion device mounted thereon, and second equipment with no vessel data conversion device.

The first equipment is where a vessel data conversion device is directly mounted, and extracts Key that can identify vessel data and Value that is the content of vessel data by parsing the collected vessel data in various formats, converts the extracted Key and Value (Key:Value) into a VDM-based integrated vessel data format (VDM Path:Value) through the vessel data conversion device, and transmits the converted integrated vessel data to VDIP.

Additionally, the Key-Value is related with the data representation format, and Name-Value, Field-Value or Attribute-Value may be applied as a similar representation method. Accordingly, instead of Key, Name, Field or Attribute may be extracted.

The second equipment converts collected vessel data in various formats into a standard format (e.g., National Marine Electronics Association (NMEA) format), and transmits it to VDIP using the User Datagram Protocol (UDP) or in the form of a file.

The first vessel data conversion device converts first vessel data in "Key:Value" format outputted from the first equipment into a VDM-based integrated vessel data format (VDM Path:Value) through a mapping operation and transmits it to VDIP.

The second vessel data conversion device extracts Key and Value by parsing second vessel data received from the second equipment, and converts the extracted Key and Value (Key:Value) into a VDM-based integrated vessel data format (VDM Path:Value) through a mapping operation.

Raw data is data in various formats collected by equipment from sensors or devices.

Equipment output data is data in a particular format transmitted from the equipment to the vessel data conversion device, and data outputted from the first equipment may be in Key and Value (Key:Value) format, and data outputted from the second equipment may be in a standard format (e.g., NMEA format).

Hereinafter, the present disclosure will be described with reference to the accompanying drawings.

First, to realize the embodiments of the present disclosure, a Vessel Data Model (VDM) established to manage all formats of data generated in the vessel into one system is described.

The VDM largely has three conceptual categories, and the three concepts are vessel data standardization principle (Principle), Language and Common Data Structure.

Figure 2:
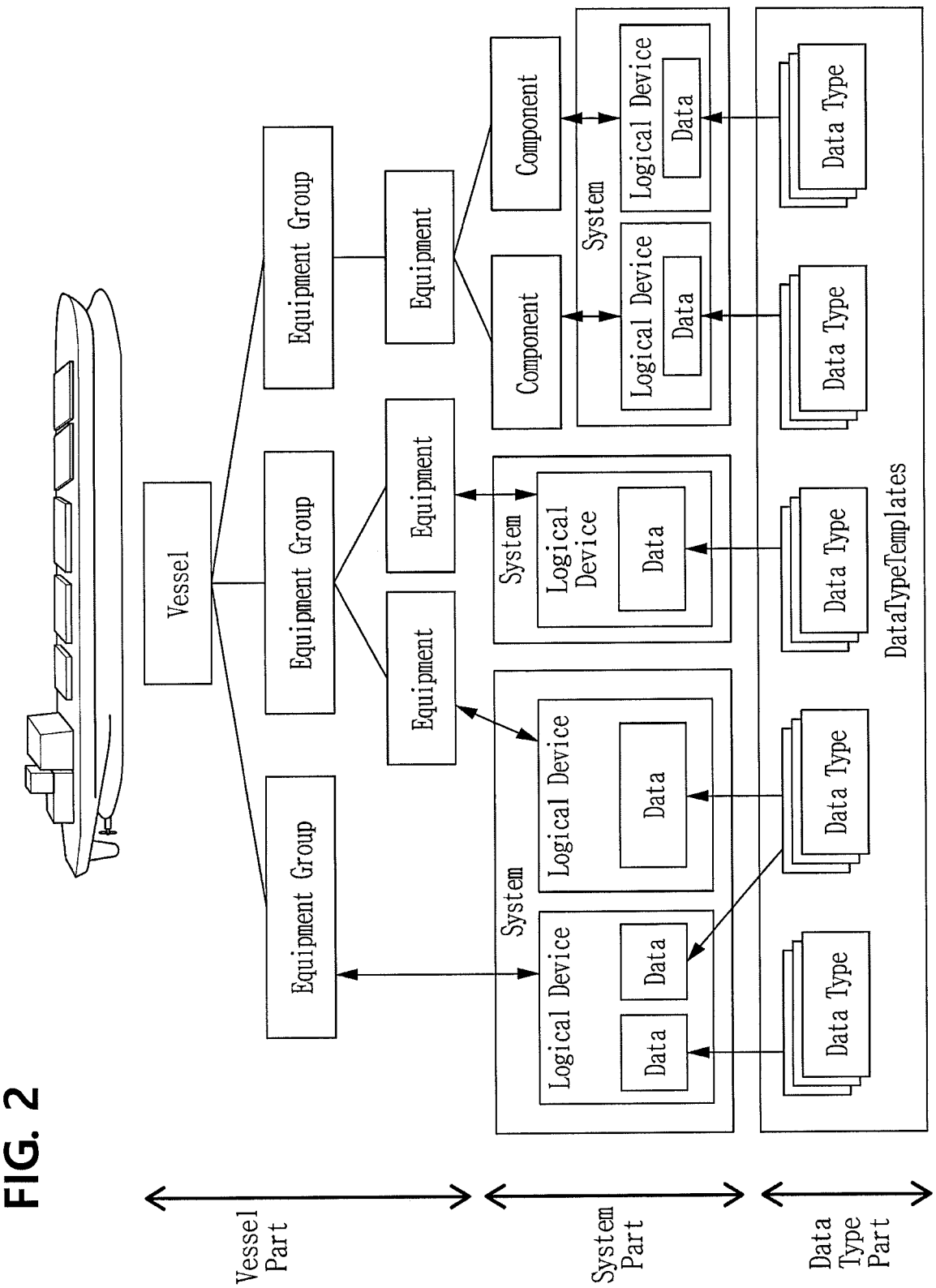
FIG. 2 is a schematic diagram showing the structure system of VDM applied to the present disclosure.

To represent vessel data, the VDM defines a combination of three models, Vessel Model of modeling Vessel Part, System Model of modeling System Part, and Data Model of modeling Data Type Part as shown in FIG. 2.

The vessel model is a hierarchical classification system of equipment that constitutes the vessel, and is an entire set of equipment that can be defined for each level, and the entire set can be extended.

As shown in Table 1, the vessel model may be defined as four levels.

TABLE 1

| Level | Name | Description | Remarks |
| --- | --- | --- | --- |
| Level 1 | Vessel | Vessel. Top-level element | |
| Level 2 | Equipment Group | Conceptual group of equipment | |
| Level 3 | Equipment | Real equipment or abstract/logical equipment | |
| Level 4 | Component | Subdivision of Equipment | optional |

As shown in FIG. 2, Vessel has one or more Equipment Groups, each Equipment Group has 0 or more Equipment, and each Equipment has 0 or more Component.

Here, the highest level, Level 1, is Vessel that signifies the vessel itself. Vessel includes an IMO number corresponding to a unique ID that identifies the vessel.

Instances of Level 2, Equipment Group level, make up one Vessel. Here, Equipment Group is subordinate to Vessel.

Level 2, Equipment Group, is a conceptual group of Level 3, Equipment, and uses the group name widely used for classification in the shipbuilding industry. For example, classification into Machinery, Hull, Electrical, and Navigational may be used.

Level 3, Equipment, is a level that mainly represents real equipment, and has the largest number of available items and instances in real equipment.

The Equipment level is not limited to only real equipment, and may represent abstract or logical equipment. For example, not only real physical equipment such as engines or boilers, but also abstract/logical concept such as stability indication and loading status may be applied.

Level 4, Component, is an optional level used when subdividing Equipment into smaller parts, and is used when classification and reuse is needed due to independency of Component itself or when the scale of Equipment itself is large. For example, in the case of the engine, many cylinders, auxiliary machines and piping systems form a huge integrated system, so when each is subdivided into components and defined, it is possible to classify under necessary viewpoints and separately use.

The entire vessel model set described above can be continuously extended.

Meanwhile, the system model is a structured logical model for data generated from the equipment that constitutes the vessel.

Mechanical, electrical, hydraulic, pneumatic, electronic, communication or software (S/W) equipment exists together in the vessel, and data generated from the equipment is collected by devices (Information Technology (IT), electronic and S/W equipment) capable of collecting data.

The system model is used to define an internal data model for data that can be collected in the individual data collection devices.

The system model increases the reusability of the data model and manages the variability in the data collection device. For example, the data collection device, equipment A, is a device that collects data related to the engine and the piping system, the device's own logical model for the engine and the piping system may be established in the device. Additionally, when the data collection device, equipment B, is a device that mainly collects data related to navigation, a logical model mainly about navigation data will be established. In case that equipment B needs to collect some of the data of equipment A in the future, it is possible to reuse the model in such a way that equipment B imports and uses the logical model of equipment A.

As shown in Table 2, the system model may be defined as four levels.

TABLE 2

| Level | Name | Description | Remarks |
| --- | --- | --- | --- |
| Level 1 | System | System | |
| Level 2 | Logical Device | Top-level logical equipment modeling | |
| Level 3 | Logical Node | Basic unit of logical function | |
| Level 4 | Data Object | Instance of data type | |

System has one or more Logical Devices, each Logical Device has one or more Logical Nodes, and each Logical Node has one or more Data Objects.

Level 1, System level, represents a data collection device (equipment), and includes one or multiple logical devices.

Level 2, Logical Device level, is the highest-level concept of logical equipment modeling, and includes one or multiple logical nodes.

Logical Device may include, for example, models of main engine, generator engine, boiler, tank and positioning device defined in System, and may be a model of concept of their combination.

Level 3, Logical Node level, includes objects that are created by modeling the function units of the vessel domain, and is the most fundamental level of VDM. Logical Node may include the following three elements.

Prefix: prefix (optional) that defines Logical Node according to the purpose or use of Logical Node
Class: indicates the type or category of Logical Node
Inst: number necessary when indicating multiple objects The Logical Node name (LNName) of is defined as <prefix>+<class>+<inst>, and this combination should be unique within a logical device to which the corresponding logical node belongs. For example, three pumps used in Central CFW system may be modeled using a predefined Pump Class, and each may be referred to as CentralCFWPump1, CentralCFWPump2 and CentralCFWPump3 so that they can be distinguished from other pumps using the prefix CentralCFW. If there is no overlap, CentralCFW may be omitted, and each may be defined as Pump1, Pump2 and Pump3.

Class of Logical Node is the key element of standardization that encourages to predefine and use the objects of the essential function units of the vessel domain.

Level 4, Data Object level, is the most basic unit of data configuration, and objectifies and defines Data Class of Data Model.

System model defines a logical node of logical equipment in a particular system.

Data model defines data class of data object of system model.

Instance of equipment or component level of vessel model may be connected with logical node of system model.

Connection information for connecting vessel model with logical node of system model may be set.

Connection information indicates system and logical device for connection of an only logical node.

Data object of system model objectifies data class of data model.

Each instance (object) defined by VDM as noted above is assigned with an object identifier for uniquely identifying each instance (object), and data attribute is defined.

VDM refers to the object identifier as VDM Path. That is, the VDM Path is used as a unique identifier for particular data in the vessel. Additionally, the VDM Path may be used as a routing rule for indicating particular vessel data on VDM.

For example, the rule of the VDM Path is as follows.
<VDM Path>=<Equipment Group Name>/<Equipment Name>/<Component Name>/<Logical Device Name>/<Logical Node Name>.<Data Object Name>.[<Data Attribute Name>]+

Here, <Logical Node Name> is composed of <prefix>+<class>+<inst>, and + following [<Data Attribute Name>] represents one or more repetitions.

| Vessel Model | | | System Model | | | | Data Model | |
|---|---|---|---|---|---|---|---|---|
| Equipment Group Name | Equipment Name | Component Name | Logical Device Name | Logical Node Name | | | Data Object Name | Data Attribute Name |
| | | | | Prefix | Class | Instance | | |

Meanwhile, the data model provides the means for creating a desired data object by providing a method that can define not only a basic data type, but also their combination, or a composite data type.

When the system model is a structured logical model for data generated from equipment that constitutes the vessel, the data model is a model that represents the generated data itself, and the data type may be defined by recursive structurization. The data model increases the reusability of the data type and manages the variability.

This data model may include the following elements.
Data Class
Data Attribute
Recursion of Data Attribute (optional)
Basic Data Type Data Object of the system model assigns an ID to objectify and define Data Class of the data model.

Data Class is a data type in which data attributes are grouped into a meaningful combination.

Data Attribute is the most basic unit of the data model and can be recursively defined, and finally, has one of basic data types (Float, Timestamp, String, . . . ) as a type.

As described above, VDM includes a vessel model, a system model and a data model, and these three models are combined to form a VDM.

The basic principle of a combination model that combines the three models described above is as follows.
Vessel model systematically classifies and hierarchically divides the vessel.

The VDM Path of this rule may or may not include the prefix of equipment and component of the vessel model and logical device and logical node of the system model if necessary.

The data attribute defines attributes that data of a corresponding instance should have.

As described above, vessel data summarized by VDM should be described in the form that can be understood by both the system and the interest parties, and to this end, VCL is defined.

VCL is the language used to write a vessel data model configuration description file for describing VDM, and the present disclosure does not limit VCL to a particular type and may use all languages satisfying the following specification as VCL.

It is possible to describe all elements of vessel model, system model, data model.

It is possible to set the values of attributes that each element has, and extend the attributes.

It is possible to describe the combination model.

In an embodiment of the present disclosure, XML (eXtensible Markup Language) Schema Definition (XSD) is used as VCL satisfying the above-described specification. A vessel data model configuration description file (e.g., VDM Configuration XML) may be created based on VCL.

The vessel data model configuration description file is a configuration file that describes VDM in VCL, and includes the definition of Vessel Part, System Part and Data Type Part.

Accordingly, it is possible to extract VDM from the vessel data model configuration description file that describes VDM in VCL, and extract VDM Path and data attributes from the extracted VDM.

Hereinafter, the vessel data integration platform (VDIP) for managing (collecting, storing, providing) vessel data in various formats made by different protocols in an integrated manner based on VDM will be described.

Figure 3:
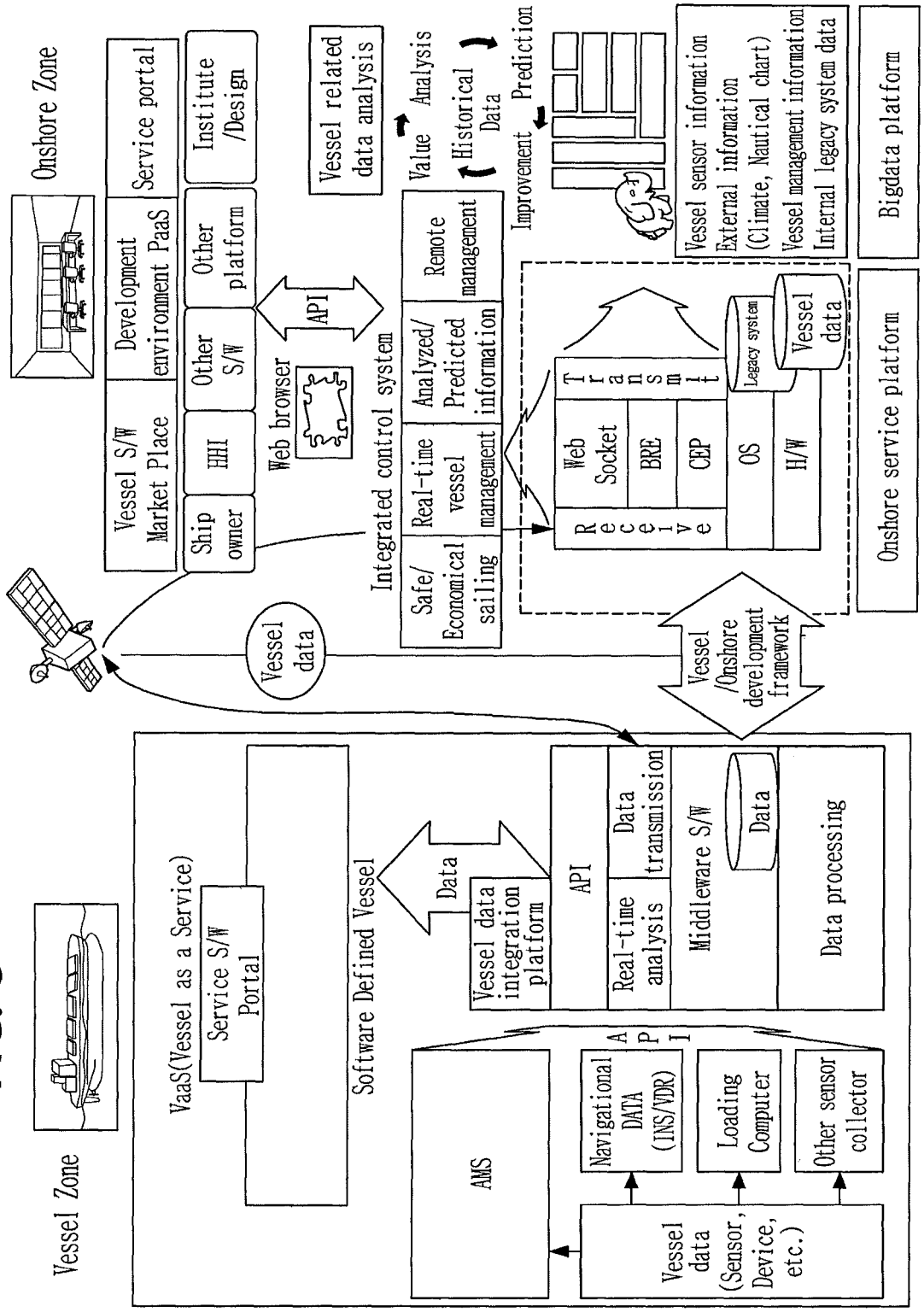
FIG. 3 is a schematic diagram showing the configuration of a smart ship with a vessel data integration platform according to an embodiment of the present disclosure.

FIG. 3 is a schematic diagram showing the configuration of a smart ship with the vessel data integration platform according to an embodiment of the present disclosure.

In FIG. 3, VDIP performs collection of various types of data in the vessel into a standardized system, processing and analysis, storage, onshore transmission and other onboard S/W data service.

Onshore service platform receives data transmitted from the vessel and stores it on the shore, and provides an overall service based on it.

Big data platform extracts and analyzes the value of data by data analysis of navigation information stored on the shore if necessary.

Figure 4:
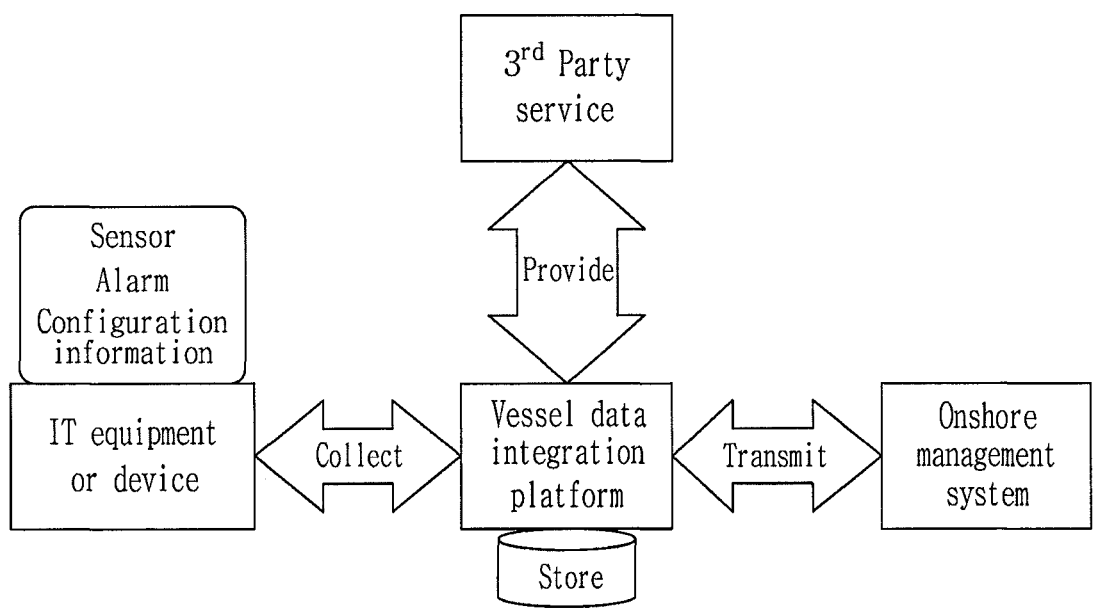
FIG. 4 is a schematic diagram showing the main functions of a vessel data integration platform according to an embodiment of the present disclosure.

FIG. 4 is a schematic diagram showing the main functions of the vessel data integration platform according to an embodiment of the present disclosure.

VDIP converts vessel data (raw data) collected from IT equipment or devices, such as alarm data, sensor data and configuration data, into a systematized format based on VDM.

Additionally, the VDM-based integrated vessel data converted into a systematized format is transmitted to an on-land management system, or provided to a third-party service.

Here, the on-land management system may be a concept corresponding to the on-land service platform of FIG. 3.

Among vessel data collected from IT equipment or devices as described above, sensor data is a real value generated from the sensor installed in the vessel, alarm data is a value representing various type of warning signals generated in the vessel, and configuration data is configuration information for each sensor, for example, the unit (e.g., m, cm, ° C., °, etc.) of the numerical value used in sensor data and the minimum value (Min)/maximum value (Max) of the numerical value.

Figure 5:
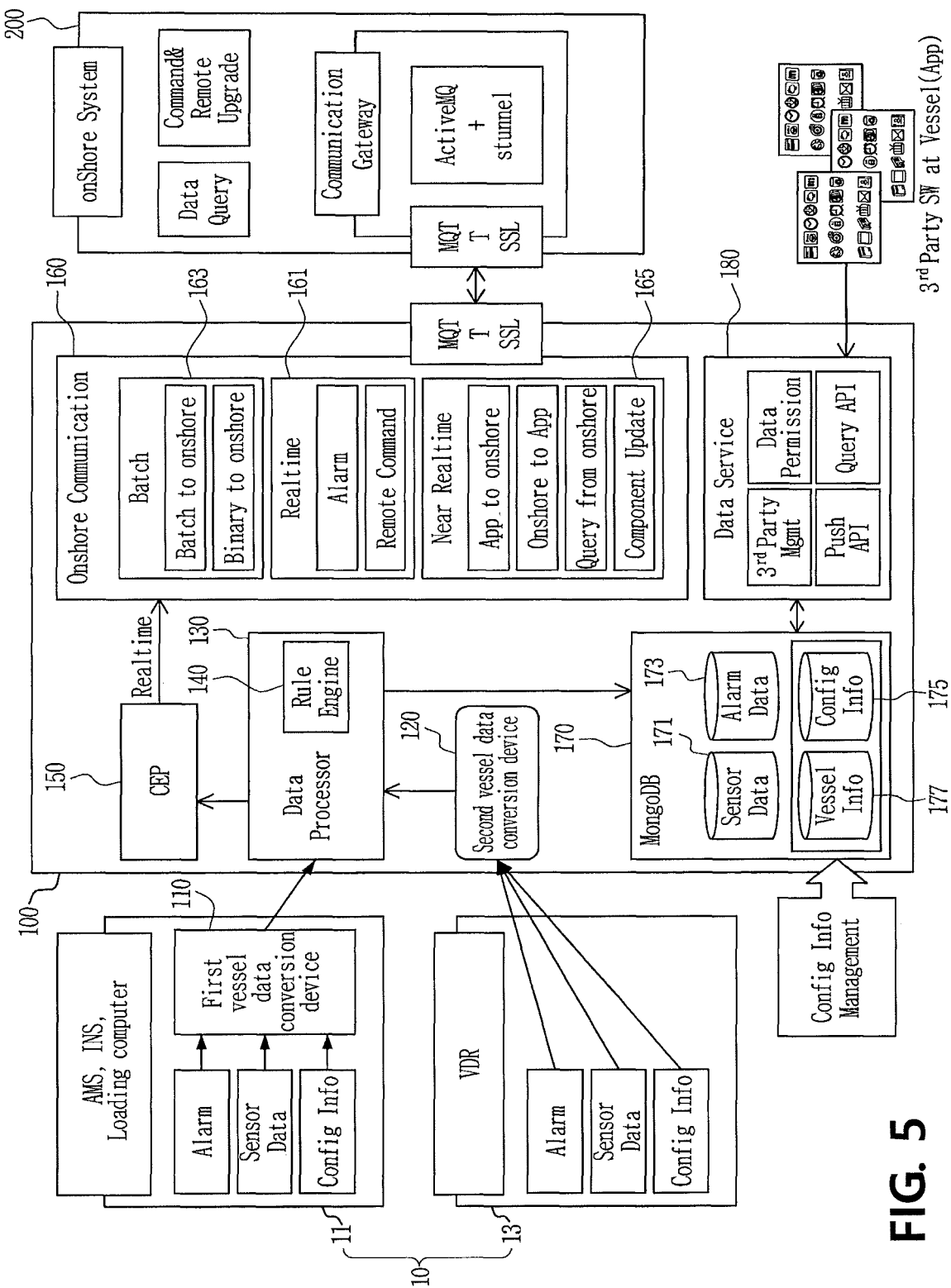
FIG. 5 is a schematic diagram showing the architecture of a vessel data integration system according to an embodiment of the present disclosure.

FIG. 5 is a diagram showing the architecture of the vessel data integration platform according to an embodiment of the present disclosure.

In FIG. 5, equipment 10 is mounted in the vessel for special purposes, and collects various types of vessel data (raw data) generated in different formats within the vessel, i.e., alarm data, sensor data and configuration data. Additionally, the equipment 10 transmits the collected vessel data (raw data) to the VDIP 100.

That is, the VDIP 100 collects vessel data through at least one equipment (e.g., AMS, INS, a loading computer, VDR, etc.) 10. As such, the VDIP 100 may directly collect vessel data, but may use the existing vessel equipment 10 as a gateway for data collection.

Here, vessel data generated in the vessel covers various types including text, audio, image, video, etc.

The equipment 10 may be divided into first equipment 11 with a first vessel data conversion device 110 mounted thereon, and second equipment 13 with no first vessel data conversion device 110.

The first equipment 11 is where the first vessel data conversion device 110 is directly mounted, and collects vessel data in various formats from at least one sensor or device, and extracts Key that can identify vessel data and Value that is the content of vessel data (Key:Value) by parsing the collected vessel data in various formats.

Additionally, the first equipment 11 converts first vessel data in a non-standard format, Key and Value (Key:Value), into a VDM-based integrated vessel data format (VDM Path:Value) through the first vessel data conversion device 110, and transmits the standardized integrated vessel data to the vessel data integration system 100.

That is, the first vessel data conversion device 110 converts the first vessel data in a non-standard format, Key and Value (Key:Value), into an integrated vessel data format (VDM Path:Value), by replacing Key received from the first equipment 11 with VDM Path assigned based on VDM. Here, a connection operation for replacing Key extracted from raw data with VDM Path assigned based on VDM is a "mapping" operation, and through the mapping operation, the extracted Key is connected to the VDM Path to convert validity verified Value into an integrated vessel data format (VDM Path:Value).

When converting Key and Value (Key:Value) into a VDM-based integrated vessel data format (VDM Path:Value) by replacing Key with VDM Path, it is necessary to verify the validity of Value of Key according to attribute of Data Attribute.

Data Attribute is attribute information of vessel data, and defines attributes that Value of vessel data should have. Accordingly, the validity of Value of Key extracted from raw data is verified according to attribute defined in Data Attribute corresponding to the corresponding vessel equipment.

The first equipment 11 may include an Alarm Monitoring System (AMS), an Integrated Navigation System (INS) and a loading computer.

The second equipment 13 converts collected vessel data in various formats into second vessel data in a standard format (e.g., NMEA format), and transmits it to the vessel data integration system 100 using the UDP or in the form of a file.

The second equipment 13 may include a Voyage Data Recorder (VDR).

The first vessel data conversion device 110 is mounted in the first equipment 11, and converts validity verified Value into an integrated vessel data format (VDM Path:Value) by connecting Key in first vessel data in a non-standard format outputted from the first equipment 11, i.e., vessel data in Key:Value format to VDM Path through a mapping operation.

The first vessel data conversion device 110 described above may be implemented as a program installed on a computer in the first equipment 11.

The first vessel data conversion device 110 described above may be referred to as Agent.

The second vessel data conversion device 120 receives the second vessel data in a standard format (e.g., NMEA format) from the second equipment 13 using the UDP or in the form of a file.

Additionally, the second vessel data conversion device 120 extracts Key and Value (Key:Value) by parsing the second vessel data received from the second equipment 13, and converts the extracted Key and Value (Key:Value) into a VDM-based integrated vessel data format (VDM Path:Value) through a mapping operation.

The second vessel data conversion device 120 described above may be implemented as a program installed on a computer, and may be referred to as Adapter.

The integrated vessel data converted by the first vessel data conversion device 110 and the second vessel data conversion device 120 described above may be represented in JavaScript Object Notation (JSON) format.

When a data processing unit 130 receives the integrated vessel data from the first vessel data conversion device 110 or the second vessel data conversion device 120, the data processing unit 130 classifies the received integrated vessel data by type based on tag information of the integrated vessel data. That is, the received integrated vessel data is classified into alarm data, sensor data and configuration data based on tag information of the integrated vessel data.

Among the integrated vessel data classified as described above, data that needs to be transmitted in real time like alarm data is transmitted to a Complex Event Processing (CEP) 150 which may be implemented as a program installed on a computer. Additionally, data (e.g., sensor data, configuration data) that does not need to be transmitted in real time is stored in a storage DB 170. In this instance, the data processing unit 130 also stores data (e.g., alarm data) that needs to be transmitted in real time in the storage DB 170.

The data processing unit 130 described above receives the integrated vessel data transmitted by the first vessel data conversion device 110 using a message queue.

A rule engine 140 manages a data validity validation rule necessary to verify the validity of the integrated vessel data received from the first vessel data conversion device 110 or the second vessel data conversion device 120. For example, the rule engine 140 may manage the minimum value (Min) and the maximum value (Max) for each sensor to verify the validity of sensor data.

Additionally, the rule engine 140 allows the integrated vessel data received from the first vessel data conversion device 110 or the second vessel data conversion device 120 to be stored in a corresponding DB provided in the storage DB 170. That is, sensor data is stored in a sensor data DB 171, alarm data is stored in an alarm data DB 173, and configuration data is stored in a configuration data DB 175.

Through real-time data analysis, the CEP 150 filters integrated vessel data (e.g., alarm data) that needs to be immediately transmission processed in real time among the integrated vessel data received from the data processing unit 130, and transmits the filtered integrated vessel data in real time via satellite communication through a real-time data transmission unit 161 of an onshore communication unit 160.

Here, the communication protocol used for data transmission using satellite communication may include Message Queueing Telemetry Transport (MQTT), Constrained Application Protocol (CoAP), Mail, File Transfer Protocol (FTP), Simple Control Protocol (SCP), HyperText Transfer Protocol (HTTP), etc. Preferably, Internet of Things (IoT) application protocol, MQTT, may be used. Satellite communication services that can be used for data transmission may include 1) Fixed Satellite Service (FSS), 2) Mobile Satellite Service (MSS) and 3) Broadcast Satellite Service (BSS) according to the purpose of use, and may include 4) international satellite service (INTELSAT, INMARSAT), 5) regional satellite service (EUTELSAT, PANAMSAT) and 6) domestic satellite service (KORESAT, BS) according to the area. Additionally, Very Small Aperture Terminal (VSAT) that is a satellite communication service provided using small-diameter antennas and onshore equipment with low transmit output may be used. Preferably, Inmarsat Fleet-Broadband (FB), Inmarsat Global Express (Xpress) or Fleet Xpress may be used.

Additionally, data transmission by the onshore communication unit 160 may be performed through wireless communication protocols other than satellite communication. For example, Wireless LAN (WLAN), Wi-Fi, Wireless broadband (Wibro), World Interoperability for Microwave Access (Wimax), or general mobile communication methods such as High Speed Downlink Packet Access (HSDPA), $3^{rd}$ Generation (3G), Long Term Evolution (LTE), Long Term Evolution-Advanced (LTE-A), etc. may be used. Particularly, when the vessel including the vessel data integration system 100 is near or along the shore or close to the on-land management system 200, data transmission may be performed after changing to wireless communication, not satellite communication.

The onshore communication unit 160 is responsible for data transmission and reception between the vessel data integration system 100 and the on-land management system 200.

A real-time data transmission unit 161 of the onshore communication unit 160 is responsible for transmission processing of data (e.g., alarm data) that needs to be transmitted in real time.

A batch data transmission unit 163 is responsible for transmission processing of data stored in the storage DB 170 in a periodic time unit.

A remote data query unit 165 is responsible for querying the corresponding vessel data from the storage DB 170 and transmitting it in response to a vessel data query request from the shore.

The storage DB 170 stores and manages the integrated vessel data, and includes the sensor data DB 171 to store sensor data, the alarm data DB 173 to store alarm data, the configuration data DB 175 to store configuration data, and a vessel data DB 177 to store metadata and design data.

The above-described storage DB 170 stores the collected integrated vessel data for a predetermined period of time (e.g., 30 days) to allow history tracking on the shore and prevent data losses caused by network disconnection.

The vessel data stored in the above-described storage DB 170 is preferably stored according to the VDM system.

Additionally, the storage DB 170 may be implemented as MongoDB of Not only SQL (Structured Query Language) (NoSQL) to provide flexibility of data management.

A data service providing unit 180 searches for data that a third party service needs, in the storage DB 170, and provides it. Here, the third party service may specify and query desired data using VDM Path based on VDM.

When the third party service requests data using VDM Path as described above, the data service providing unit 180 identifies if the third party service has an access authority for the VDM Path-based data range requested from the third party service.

As a result of identification, only when the third party service has the access authority, the data service providing unit 180 may query the corresponding data and provide the query result to the third party service.

The data providing method largely includes Query method Push method.

The vessel data integration system configured as noted above collects vessel data in various formats made by different protocols, convert it into a systematic integrated vessel data format based on VDM, and provides the converted integrated vessel data to the shore or the third party service.

The vessel data integration system as noted above may be implemented in the form of software and firmware that manages vessel data in an integrated manner and provided in the vessel, and may be implemented as any system including software, firmware and hardware devices that manage vessel data in an integrated manner or their selective combinations and provided in the vessel.

As described above, the vessel data integration system 100 according to an embodiment of the present disclosure collects vessel data through at least one equipment (e.g., AMS, INS, a loading computer, VDR, etc.) 10:11, 13, and the equipment collects various types of vessel data (e.g., alarm data, sensor data, configuration data, etc.) generated in the vessel.

Among the above-described vessel data, alarm data is collected and managed by the Alarm Monitoring System (AMS) specialized in managing alarm data on the basis of alarm data defined by VDM.

Alarm data is not separately generated in the vessel data integration system 100, and the vessel data integration system 100 receives and manages alarm data generated from AMS.

The reason of using this alarm management function is to manage the alarm data system of the same content as the vessel.

The vessel data integration system 100 does not receive all alarm data generated from AMS, and receives only sensor information defined by VDM.

Figure 6:
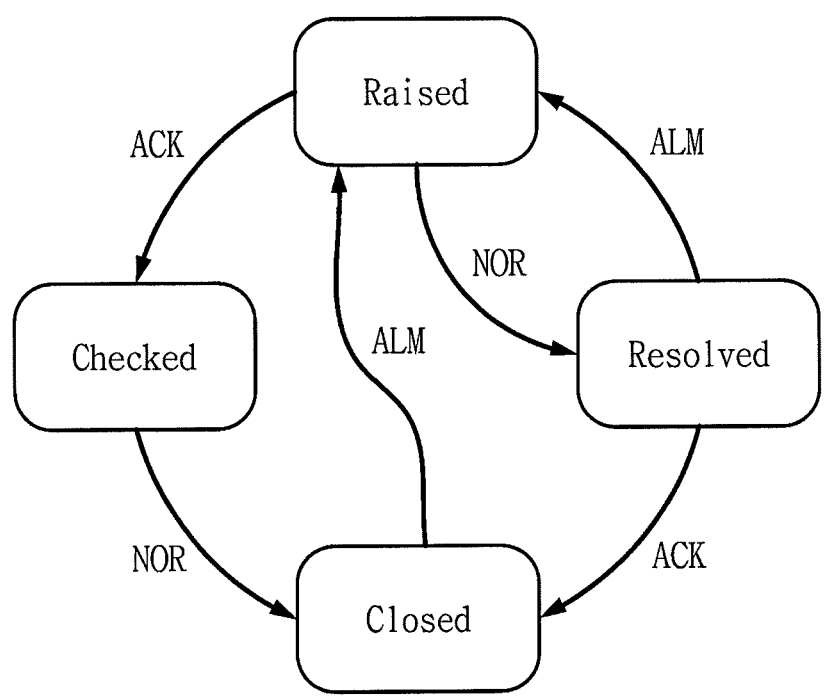
FIG. 6 is a diagram showing the status transition of alarm data according to an embodiment of the present disclosure.

FIG. 6 is a diagram showing the status transition of alarm data, in which when an alarm event is raised (Raised), a sailor checks it (Checked), and the status is changed to ACK (Acknowledge). Here, when the sailor normally processes alarm, the status is changed to NOR (Normal) and alarm ends. Additionally, after the alarm event is raised, when a NOR event is raised (Resolved) first and then an ACK event is raised, the alarm event ends.

This is represented as shown in Table 3.

TABLE 3

| Classification | Status | Event | Description |
| --- | --- | --- | --- |
| Alarm raised | Raised | ALM | ALM event is raised |
| Alarm checked | Checked | ACK | ALM -> ACK event is raised |
| Alarm end | Resolved | NOR | NOR event is raised first without ACK event - in the case of ACK event, update and change to closed status |
| | Closed | | Corresponding alarm event ends ALM -> ACK -> NOR event is raised ALM -> NOR -> ACK event is raised |

FIG. 7 is a diagram illustrating the procedure of transmitting alarm data generated from AMS, in which first equipment AMS 13 periodically transmits alarm data to Agent.

The first vessel data conversion device 110 extracts Key and Value (Key:Value) by parsing alarm data received from AMS, and converts into VDM-based integrated vessel data format (VDM Path:Value) by mapping the extracted Key to VDM Path, and transmits the converted integrated vessel data to the vessel data integration system 100.

Additionally, to manage configuration data of equipment and sensors of the vessel, the vessel data integration system 100 internally manages information such as VDM Path, the sensor name, the sensor manufacturer, the sensor model number, the sensor serial number, the sensor type, the period of time during which sensor data is collected, the minimum value and the maximum value.

The configuration data is transmitted to other system such as an onshore system, and the configuration of sensor data values may be identified for use in service development.

Meanwhile, sensor data may largely include three elements as shown in Table 4.

TABLE 4

| TimeStamp | Value | Invalid/Valid |
| --- | --- | --- |
| Time when data is collected UTC | Actually measured value | Whether Value is valid or invalid 1: Valid 0: Invalid |

The structure of this value is used as a main format when transmitting data to the shore, where the value is determined to be invalid or valid (Invalid/valid) to determine whether to use the value.

Figure 8:
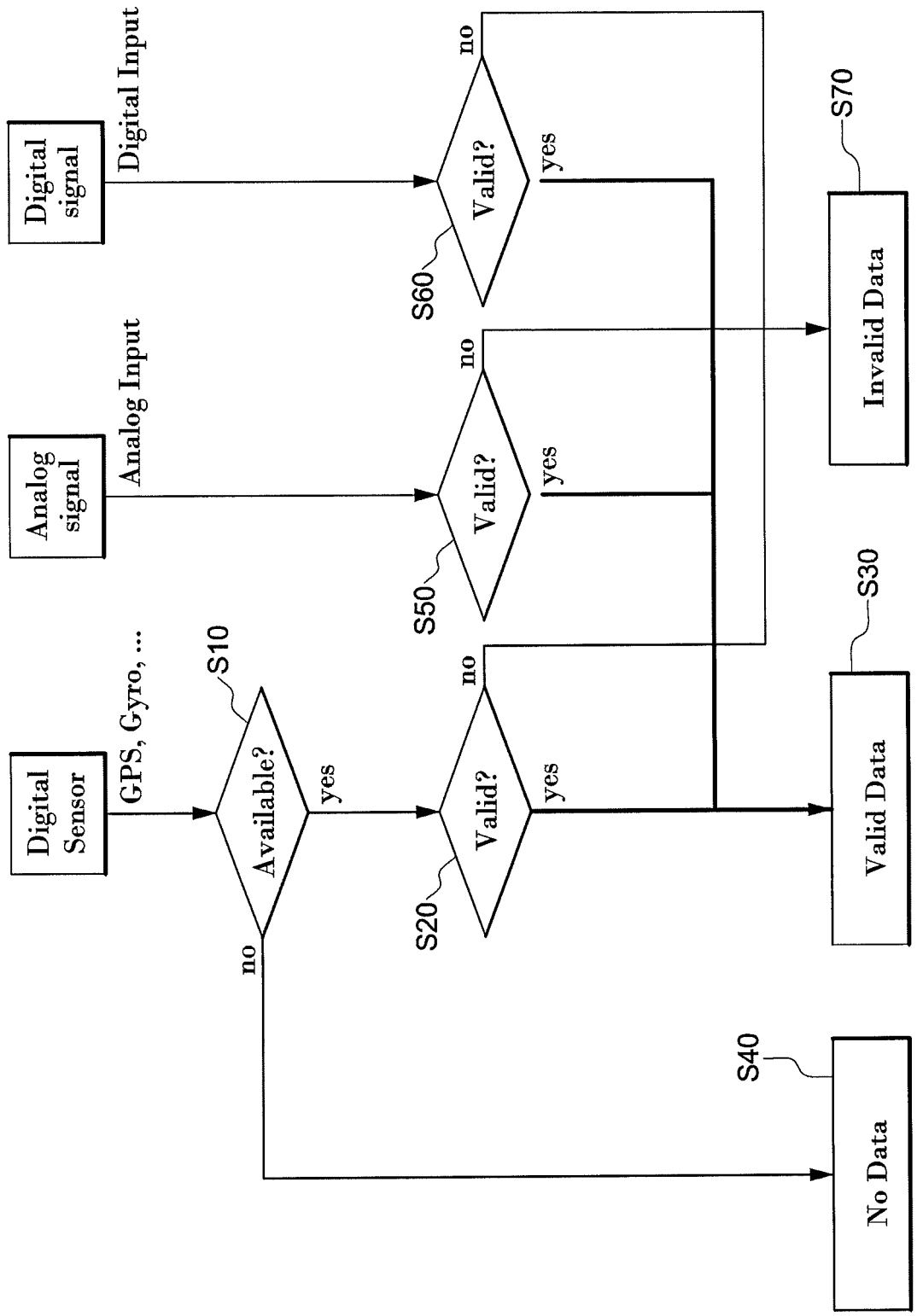
FIG. 8 is a processing diagram illustrating a validity determination process of sensor data according to an embodiment of the present disclosure.

The validity determination of sensor data is made as shown in FIG. 8, and for a sensor data value outputted from a digital sensor, when the corresponding value is an available value (S10: yes), and is a data value within the minimum and maximum value range (S20: yes), the corresponding sensor value is determined to be valid data (S30).

Additionally, when the sensor data value is an unavailable value (S10: no), it is determined to be unavailable data (S40).

Additionally, when the sensor data value is an available value (S10: yes), but is not a data value within the minimum and maximum value range (S20: no), the corresponding sensor value is determined to be invalid data (S70).

Meanwhile, for an analog signal and a digital signal, when the corresponding data value is a data value within the minimum and maximum value range (S50, S60: yes), the corresponding sensor value is determined to be valid data (S30), and when the corresponding data value is not a data value within the minimum and maximum value range (S50, S60: no), the corresponding sensor value is determined to be invalid data (S70).

Meanwhile, as described above, the vessel data integration system 100 having converted various formats of vessel data into the VDM-based integrated vessel data through the first vessel data conversion device 110 or the second vessel data conversion device 120 provides the converted integrated vessel data to the on-land management system 200 or the third party service. In this instance, the data format of the integrated vessel data provided to the on-land management system 200 or the third party service may use JSON.

The vessel data transmission format of alarm data, sensor data and configuration data may be divided into a header region and a data region, a transaction ID, a device ID, a device type, a tenant ID and an enterprise ID may be included in the header region, and this may change depending on the content requested from the shore.

The data region includes VDM Path and vessel data, and the VDM path may hierarchically express the path defined in VDM, for example, in JSON format. Additionally, the vessel data indicates repeatedly information collected with a set of timestamp indicating the time at which Value is collected, Value, and whether Value is valid or not.

The method whereby the vessel data integration system 100 provides vessel data to the on-land management system 200 is largely divided into Push method and Query method, and Push method may be subdivided into real-time data transmission and periodic data transmission.

Figure 9:
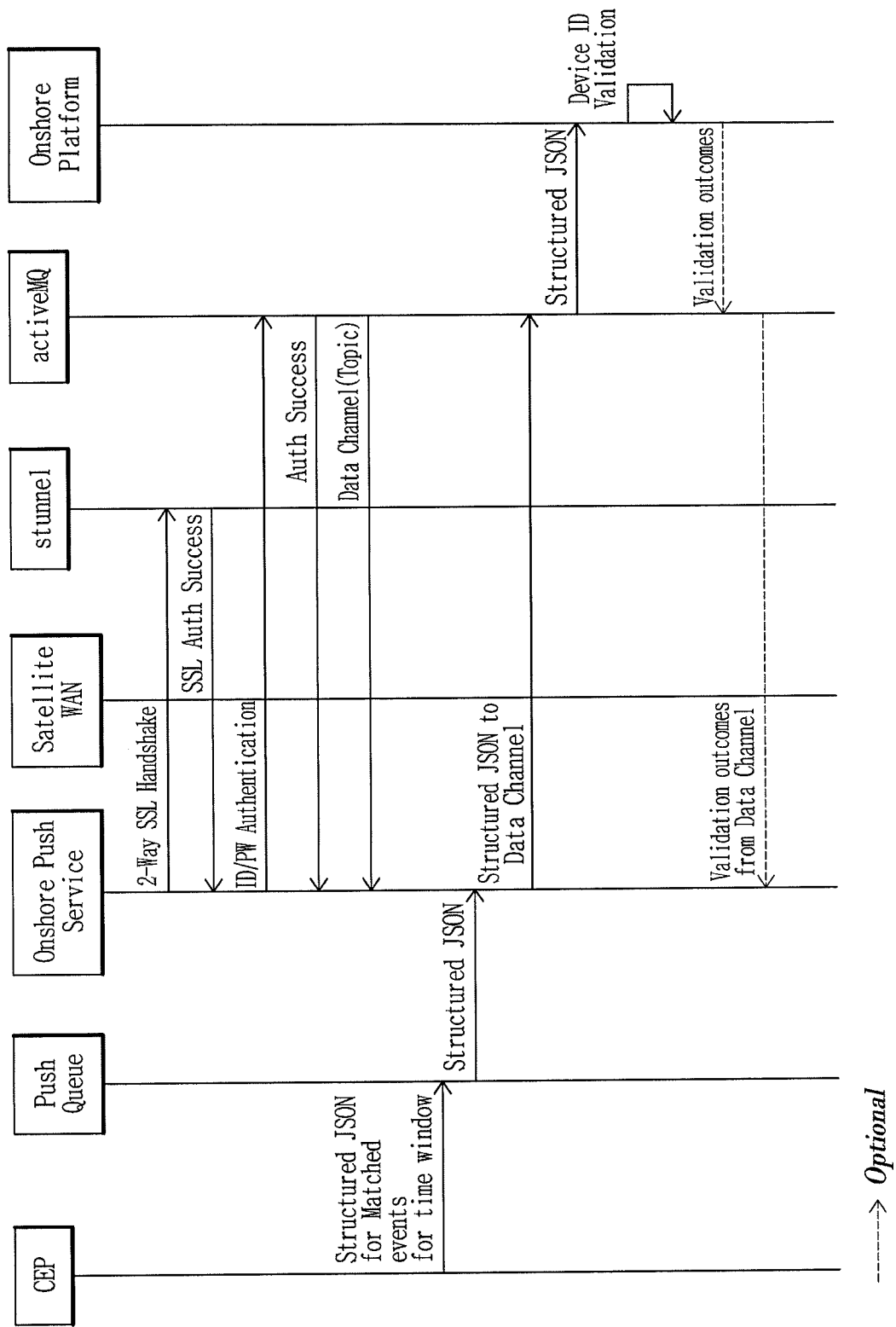
FIG. 9 is a processing diagram illustrating a real-time data transmission process in a vessel data integration platform according to an embodiment of the present disclosure.

FIG. 9 is a processing diagram illustrating the real-time data transmission process in the vessel data integration platform according to an embodiment of the present disclosure, and is described with reference to FIG. 5.

When receiving input of VDM-based integrated vessel data from the first vessel data conversion device 110 or the second vessel data conversion device 120 through the data processing unit 130, the CEP 150 of the vessel data integration system 100 filters data (e.g., alarm data) which needs to be transmitted in real time among the received integrated vessel data.

The integrated vessel data filtered for real-time transmission is transmitted to the on-land management system 200 in real time via satellite communication. Here, the filtering rule of data which needs to be transmitted in real time is set to the CEP 150 through a peacock edge server.

When an onboard service software intends to push back real-time data, the CEP 150 transmits to a topic listener through a queue for real-time data processing, and the topic listener processes the received data and transmits it to Push Application Programming Interface (API) implementation.

For real-time data transmission, the vessel data integration system 100 establishes up session connection by the 2Way SecureSocketsLayer (SSL) Handshake with the on-land management system 200 via satellite communication.

When session connection is established, authentication is performed using an ID and a password, and when authentication succeeds, a data channel with the on-land management system 200 is set up.

The vessel data integration system 100 transmits data which needs to be transmitted in real time through the set data channel. In this instance, the vessel data integration system 100 may convert the corresponding data into JSON format and transmit it to the on-land management system 200.

Figure 10:
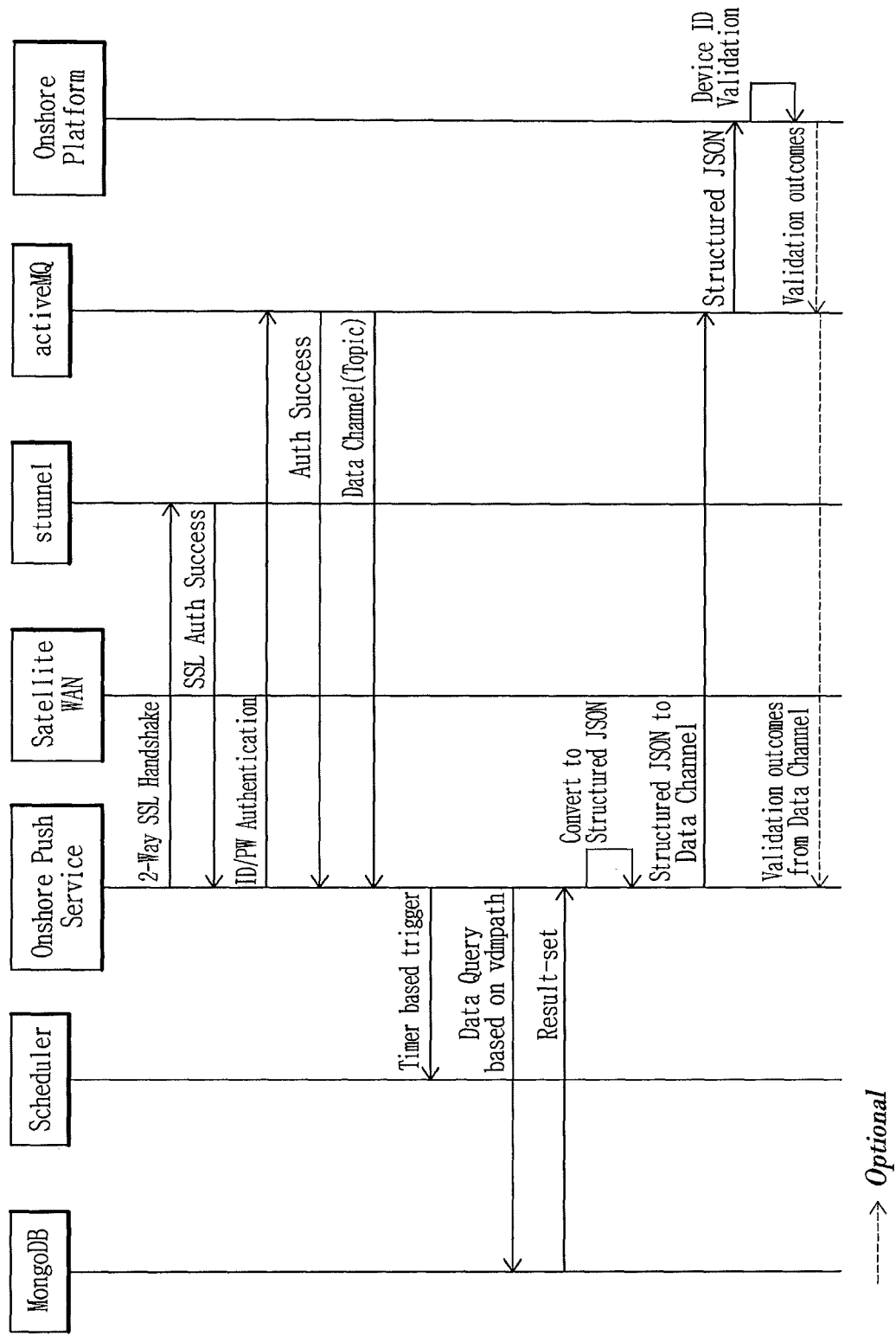
FIG. 10 is a processing diagram illustrating a periodic data transmission process in a vessel data integration platform according to an embodiment of the present disclosure.

FIG. 10 is a processing diagram illustrating the periodic data transmission process in the vessel data integration platform according to an embodiment of the present disclosure, and is described with reference to FIG. 5.

All vessel data inputted from the first vessel data conversion device 110 or the second vessel data conversion device 120, including alarm data which needs to be transmitted in real time, is stored in the storage DB 170 and transmitted to the on-land management system 200 in a preset periodic time unit. That is, when it is time to transmit batch data stored in the storage DB 170 to the on-land management system 200, the storage DB 170 is requested for data to transmit to the on-land management system 200 based on VDM Path, and as its result is received, data is transmitted to the on-land management system 200 through a data channel. Here, vessel data transmitted from the vessel data integration system 100 to the on-land management system 200 is VDM-based integrated vessel data, and each vessel data included in the data region of integrated vessel data transmission format is identified by the VDM Path. Additionally, data transmitted to the on-land management system 200 may be converted into JSON format and transmitted.

Figure 11:
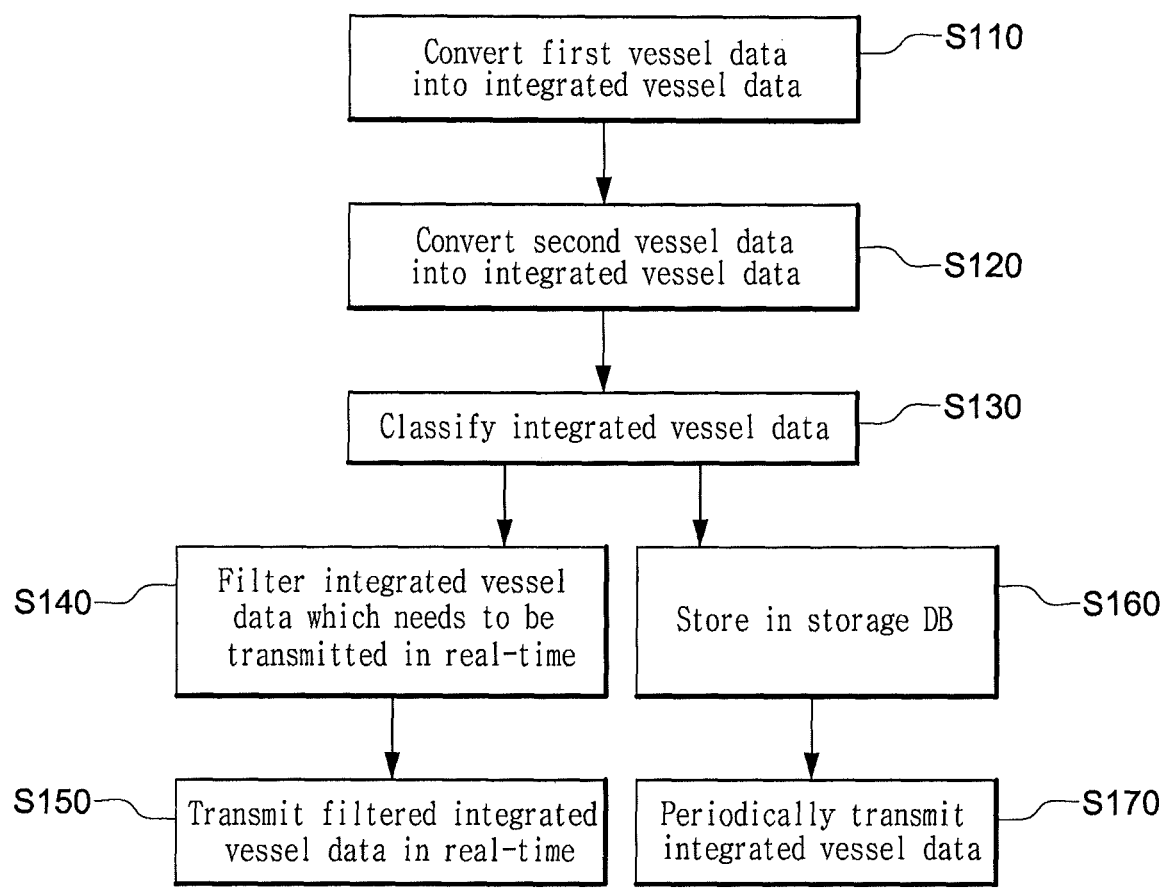
FIG. 11 is a processing diagram illustrating a method for transmitting vessel data in a vessel data integration system according to an embodiment of the present disclosure.

FIG. 11 is a processing diagram illustrating a method for transmitting vessel data in a vessel data integration system according to an embodiment of the present disclosure.

First, the first vessel data conversion device 110 receives first vessel data in a non-standard format (Key:Value), converts it into integrated vessel data in a systemized data format using a VDM-based VDM Path, and transmits it to the data processing unit 130 (S110).

Additionally, the second vessel data conversion device 120 receives second vessel data in a standard format (e.g., NMEA format) from the second equipment 13, converts it into integrated vessel data in a systemized data format using a VDM-based VDM path, and transmits it to the data processing unit 130 (S120).

The data processing unit 130 having received the integrated vessel data from the first vessel data conversion device 110 or the second vessel data conversion device 120 through the above-described step S110 or S120 classifies the received integrated vessel data by type based on tag information, and for data which needs to be transmitted in real time, such as alarm data, among the classified integrated vessel data, transmits it to the CEP 150 (S130).

In the above-described step S130, the data processing unit 130 classifies the received integrated vessel data into alarm data, sensor data and configuration data based on tag information of the integrated vessel data.

The CEP 150 having received the integrated vessel data from the data processing unit 130 through the above-described step S130 filters integrated vessel data which needs to be transmitted in real time among the integrated vessel data received from the data processing unit 130, and transmits it to the real-time data transmission unit 161 (S140).

Additionally, the real-time data transmission unit 161 transmits the integrated vessel data filtered by the CEP 150 to the on-land management system 200 in real time (S150).

Meanwhile, the integrated vessel data classified by type by the data processing unit 130 through the above-described step S130 is stored in the storage DB 170 (S160).

When the integrated vessel data is stored in the storage DB 170 through the above-described step 160, preferably, sensor data is stored in the sensor data DB 171, alarm data is stored in the alarm data DB 173, and configuration data is stored in the configuration data DB 175.

Subsequently, the batch data transmission unit 163 performs transmission processing of the integrated vessel data stored in the storage DB 170 to the on-land management system 200 in a periodic time unit (S170).

Those having ordinary skill in the technical field pertaining to the present disclosure will appreciate that various modifications and changes may be made without departing from the essential nature of the present disclosure. Additionally, the embodiments disclosed in the specification and drawings are only a particular embodiment presented to easily describe the disclosure and help the understanding of the present disclosure, but not intended to limit the scope of the present disclosure. Therefore, it should be interpreted that the scope of the present disclosure covers the embodiments disclosed herein as well as all modified or changed forms derived based on the technical spirit of the present disclosure.

INDUSTRIAL APPLICABILITY

According to the vessel data integration system of the present disclosure and the vessel comprising the same, it is possible to manage (collect, store, provide) vessel data in all formats made by different protocols into an integrated data format.

The invention claimed is:
1. A vessel data integration system comprising:
a first vessel data conversion device for converting first vessel data which have a non-standard industry format into first integrated vessel data having an integrated vessel data format by using a vessel data model (VDM)-based VDM path, the VDM defining a relationship between objects of the VDM, the VDM Path being an object identifier for identifying an object defined by the VDM, wherein the VDM includes a vessel model, a system model and a data model, wherein the vessel model defines hierarchical levels of equipment, the system model is a structured logical model that defines hierarchical levels for collecting data, and the data model represents the data generated from the equipment;
 a second vessel data conversion device for converting second vessel data which have a standard industry format into second integrated vessel data having the integrated vessel data format;
 a data processing device for classifying, by type, the integrated vessel data received from the first vessel data conversion device or the second vessel data conversion device;
 a complex event processing (CEP) device for filtering out integrated vessel data, among the integrated vessel data classified by the data processing device, which needs to be transmitted in real-time; and
 a real-time data transmission device for transmitting in real-time the integrated vessel data filtered out by the CEP device to an on-land management system.

2. The vessel data integration system according to claim 1, further comprising:
 a database for storing the integrated vessel data classified by the data processing device; and
 a batch data transmission device for transmitting the integrated vessel data stored in the database to the on-land management system in a preset cycle.

3. The vessel data integration system according to claim 2, wherein the database is provided for each type of the integrated vessel data.

4. The vessel data integration system according to claim 1, wherein a transmission format of the integrated vessel data includes:
 a header region including at least one of a transaction ID, a device ID, a device type, a tenant ID and an enterprise ID; and
 a data region including a VDM path and vessel data.

5. The vessel data integration system according to claim 4, wherein the vessel data includes at least one dataset, wherein the dataset includes collected Value, a time at which the Value is collected, and whether the Value is valid or invalid.

6. The vessel data integration system according to claim 1, wherein the data processing device classifies the integrated vessel data based on tag information of the integrated vessel data.

7. The vessel data integration system according to claim 1, wherein the data processing device comprises a rule engine to manage a data validity validation rule necessary to verify validity of the integrated vessel data, and the data processing device verifies validity of the received integrated vessel data according to the data validity validation rule.

8. The vessel data integration system according to claim 1, wherein the data processing device comprises a rule engine to allow the integrated vessel data classified by type to be stored in a specified DB.

9. The vessel data integration system according to claim 1, wherein the integrated vessel data comprises at least one of: alarm data, sensor data and configuration data.

10. The vessel data integration system according to claim 1, wherein the integrated vessel data which needs to be transmitted in real-time is alarm data.

11. A method for transmitting vessel data in a vessel data integration system, comprising:
 converting, by the system, first vessel data which have a non-standard industry format and are received from first equipment into first integrated vessel data having an integrated vessel data format by using a vessel data model (VDM)-based VDM path, the VDM defining a relationship between objects of the VDM, the VDM Path being an object identifier for identifying an object defined by the VDM, wherein the VDM includes a vessel model, a system model and a data model, wherein the vessel model defines hierarchical levels of equipment, the system model is a structured logical model that defines hierarchical levels for collecting data, and the data model represents the data generated from the equipment;
 converting, by the system, second vessel data which have a standard industry format and are received from second equipment into second integrated vessel data having the integrated vessel data format;
 classifying, by the system, the integrated vessel data collected through the first vessel data conversion device or the second vessel data conversion device by type;
 filtering, by the system, integrated vessel data which needs to be transmitted in real-time among the classified integrated vessel data; and
 transmitting, by the system, the filtered integrated vessel data to an on-land management system in real-time.

12. The method for transmitting vessel data in the vessel data integration system according to claim 11, further comprising:
 storing the classified integrated vessel data in a database; and
 transmitting the integrated vessel data stored in the database to the on-land management system in a preset cycle.

* * * * *